United States Patent
Stearns et al.

(10) Patent No.: US 10,067,493 B2
(45) Date of Patent: Sep. 4, 2018

(54) FREQUENCY CONTROL METHOD AND FREQUENCY CONTROL SYSTEM

(71) Applicant: PANASONIC INTELLECTUAL PROPERTY MANAGEMENT CO., LTD., Osaka (JP)

(72) Inventors: Hoday Stearns, Santa Clara, CA (US); Kenichi Watanabe, Osaka (JP); Mitsuru Kaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 14/781,114

(22) PCT Filed: Feb. 26, 2014

(86) PCT No.: PCT/JP2014/001028
§ 371 (c)(1),
(2) Date: Sep. 29, 2015

(87) PCT Pub. No.: WO2014/167768
PCT Pub. Date: Oct. 16, 2014

(65) Prior Publication Data
US 2016/0048118 A1    Feb. 18, 2016

(30) Foreign Application Priority Data

Apr. 12, 2013   (JP) .................... 2013-084369

(51) Int. Cl.
*G05D 17/00*    (2006.01)
*G05B 19/10*    (2006.01)
(Continued)

(52) U.S. Cl.
CPC ....... *G05B 19/106* (2013.01); *G05B 19/0423* (2013.01); *H02J 3/24* (2013.01);
(Continued)

(58) Field of Classification Search
CPC ....... G05B 13/02; G05B 19/106; F01D 17/00; F01D 19/1039; F02C 9/42; F03D 7/028;
(Continued)

(56) References Cited

U.S. PATENT DOCUMENTS 3,564,273 A * 2/1971 Cockrell ................. F01D 17/00
                                                      290/40 R
4,305,129 A * 12/1981 Yannone ................... F02C 9/42
                                                      290/40 R
(Continued)

FOREIGN PATENT DOCUMENTS

EP    1381132    1/2004
JP    4-42920    7/1992
(Continued)

OTHER PUBLICATIONS

Search Report issued by WIPO in Patent Application No. PCT/JP2014/001028, dated May 27, 2014.
(Continued)

*Primary Examiner* — Tuan Vu
(74) *Attorney, Agent, or Firm* — Greenblum & Bernstein, P.L.C.

(57) ABSTRACT

A frequency control method for use in a frequency control system including: a server that receives, from a power system operator, a power command for controlling a frequency of a power grid within a predetermined frequency; at least one distributed energy resource; and a local controller connected to the server through a communication network and to the at least one distributed energy resource, the frequency control method includes: receiving the power command from the power system operator; obtaining a frequency measurement of the power grid; predicting a next power command using the frequency measurement, before the next power command is received from the power system operator; and controlling an input or output of the at least (Continued)

one distributed power energy resource using the predicted next power command, before the next power command is received from the power system operator.

12 Claims, 12 Drawing Sheets

(51) Int. Cl.
*H02J 3/24* (2006.01)
*G05B 19/042* (2006.01)
*H02J 13/00* (2006.01)
*H02J 3/00* (2006.01)

(52) U.S. Cl.
CPC ............ *G05B 2219/25354* (2013.01); *G05B 2219/2639* (2013.01); *H02J 13/0006* (2013.01); *H02J 2003/003* (2013.01); *Y04S 10/54* (2013.01)

(58) Field of Classification Search
CPC ........ F24H 4/04; G05D 23/1923; H02J 7/007; H02J 3/32; H02J 2003/003
See application file for complete search history.

(56) References Cited

U.S. PATENT DOCUMENTS

| | | | | |
|---|---|---|---|---|
| 4,425,614 A | * | 1/1984 | Barron | .................. G05B 13/02 244/195 |
| 7,105,946 B2 | | 9/2006 | Akiyama et al. | |
| 2002/0143438 A1 | | 10/2002 | Akiyama et al. | |
| 2009/0295162 A1 | * | 12/2009 | Oohara | .................. F03D 7/028 290/44 |
| 2010/0088048 A1 | | 4/2010 | Berggren et al. | |
| 2010/0191996 A1 | | 7/2010 | Iino et al. | |
| 2012/0232706 A1 | * | 9/2012 | Hayashida | .......... F24D 19/1039 700/282 |
| 2012/0296479 A1 | * | 11/2012 | Millar | ................ G05D 23/1923 700/277 |
| 2012/0323389 A1 | | 12/2012 | Shelton et al. | |
| 2013/0205814 A1 | * | 8/2013 | Hayashida | ................ F24H 4/04 62/115 |
| 2014/0018969 A1 | * | 1/2014 | Forbes, Jr. | ................ H02J 3/32 700/295 |
| 2014/0070756 A1 | * | 3/2014 | Kearns | .................... H02J 7/007 320/101 |
| 2015/0002100 A1 | | 1/2015 | Kudo et al. | |

FOREIGN PATENT DOCUMENTS

| | | |
|---|---|---|
| JP | 2002-291162 | 10/2002 |
| JP | 2004-280640 | 10/2004 |
| JP | 2005-020916 | 1/2005 |
| JP | 2005-151769 | 6/2005 |
| JP | 2006-129563 | 5/2006 |
| JP | 2009-085182 | 4/2009 |
| WO | 2013/042474 | 3/2013 |

OTHER PUBLICATIONS

Notification of Reasons for Refusal for JP 2015-511081 dated Jun. 9, 2015 with an English translation.
Decision to Grant the Patent for JP 2015-511081 dated Jul. 21, 2015 with an English translation.
Extended Search Report issued by European Patent Office (EPO) patent office in European Patent Office (EPO) Patent Application No. 14783390.9, dated Jul. 14, 2016.

* cited by examiner

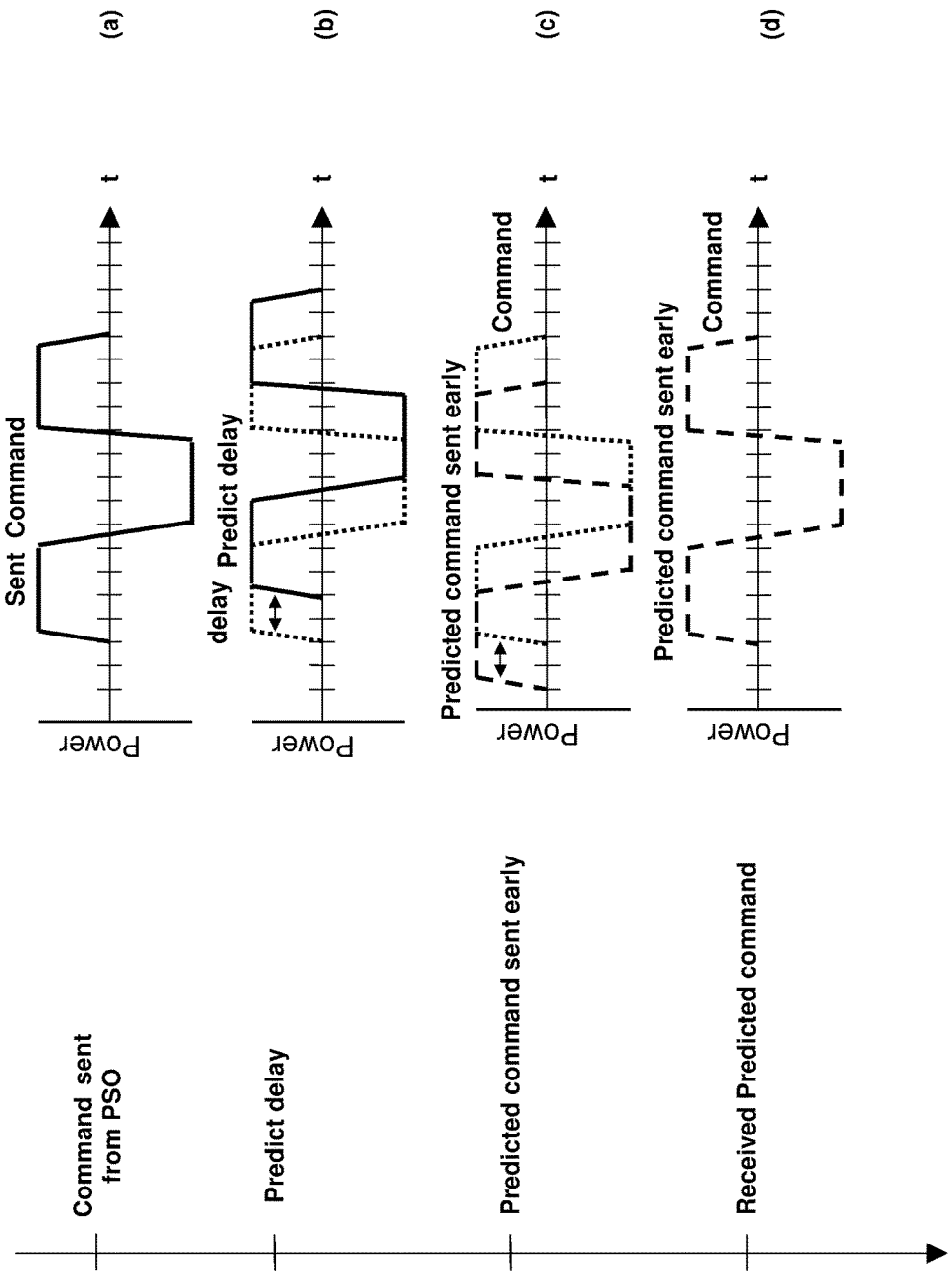

FREQUENCY CONTROL METHOD AND FREQUENCY CONTROL SYSTEM

TECHNICAL FIELD

The present invention relates to a frequency control method, a frequency control system, a frequency control device, or a frequency control program that reduces an influence of communication delay in controlling electric inputs or outputs of power sources so as to control a frequency of a grid.

BACKGROUND ART

There are many electricity transmission systems and distribution systems operating at a fixed frequency, for example, at 50 Hz or 60 Hz. Grid frequency control systems control resources such as power sources (generators) and energy storage resources.

In order to maintain grid frequency stability, grid operators send commands for controlling the amount of power withdrawn from the grid by loads and the amount of power injected to the grid by generators, storage, and renewable energy sources. The power sources and the energy storage resources control inputs or outputs of their power.

However, large delay occurs in transmission of command signals from a grid operator's computer to receivers. To overcome the delay, there is a system that creates, at a receiver side, a control signal having a grid frequency, instead of using commands sent from the grid operator (see PTL 1, for example).

CITATION LIST

Patent Literature

[PTL 1] Japanese Unexamined Patent Application Publication No. 2005-20916

SUMMARY OF INVENTION

Technical Problem

However, the system described in PTL 1 doesn't disclose any methods that overcome the delay in transmission from a grid operator's computer to receivers.

In view of the above, the present invention provides a frequency control method which includes a control prediction part for reducing an influence of communication delay and predicting a command more accurately in controlling electric inputs or outputs of systems connected to the grid.

Solution to Problem

A frequency control method according to an aspect of the present invention is a frequency control method for use in a frequency control system including: a server that receives, from a power system operator, a power command for controlling a frequency of a power grid within a predetermined frequency; at least one distributed energy resource; and a local controller connected to the server through a communication network and to the at least one distributed energy resource. The frequency control method includes: receiving the power command from the power system operator; obtaining a frequency measurement of the power grid; predicting a next power command using the frequency measurement, before the next power command is received from the power system operator; and controlling an input or output of the at least one distributed power energy resource using the predicted next power command, before the next power command is received from the power system operator.

These general and specific aspects may be implemented using a system, an apparatus, a method, an integrated circuit, a computer program, or a non-transitory computer-readable recording medium such as a CD-ROM, or any combination of systems, apparatuses, methods, integrated circuits, computer programs, or computer-readable recording media.

Advantageous Effects of Invention

According to the present invention, it is possible to reduce an influence of communication delay and to predict a command more accurately in controlling electric inputs or outputs of systems connected to a grid.

BRIEF DESCRIPTION OF DRAWINGS

FIG. 6 is a diagram showing examples of a command, a delayed command, and a predicted command as a function of time.

DESCRIPTION OF EMBODIMENTS

Figure 1:
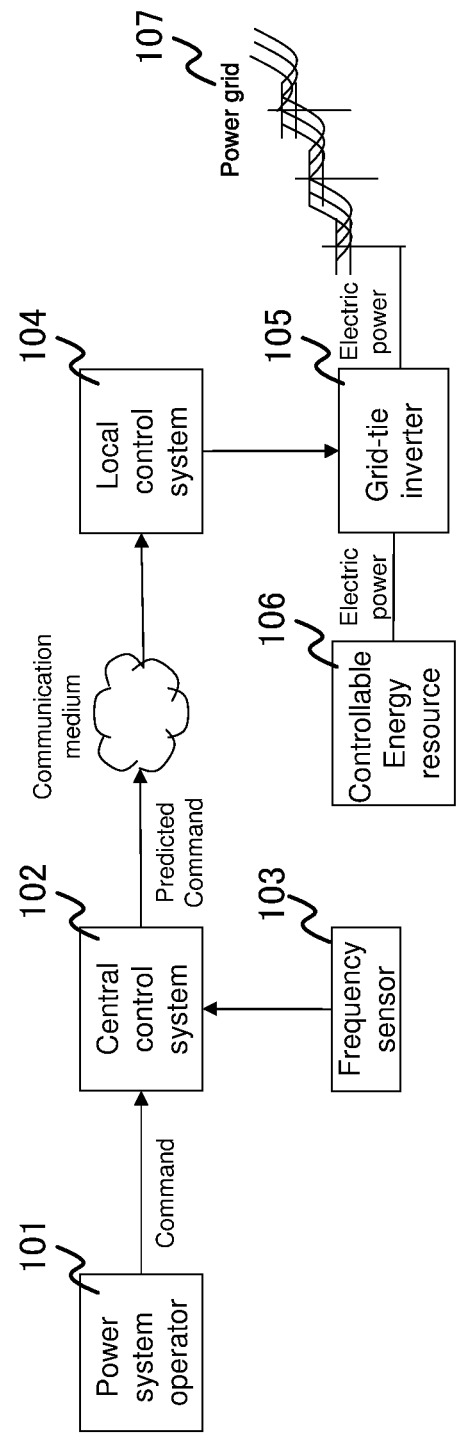
FIG. 1 is a diagram showing a system configuration according to an embodiment 1 of the present invention.

The present invention is a frequency control method for use in a frequency control system including: a server that receives, from a power system operator, a power command for controlling a frequency of a power grid within a predetermined frequency; at least one distributed energy resource; and a local controller connected to the server through a communication network and to the at least one distributed energy resource. The frequency control method includes: receiving the power command from the power system operator; obtaining a frequency measurement of the power grid; predicting a next power command using the frequency measurement, before the next power command is received from the power system operator; and controlling an input or output of the at least one distributed power energy resource using the predicted next power command, before the next power command is received from the power system operator.

For example, the frequency control method may include: calculating communication delay time in the communication network; and controlling the input or output of the at least one distributed power energy resource using the predicted next power command, based on the communication delay time.

This reduces an influence of the communication delay, allowing responses of the distributed energy resources to be matched more closely to the command sent from the power system operator. The responses of the distributed energy resources can be matched more closely to the command sent from the power system operator, improving controllability and stability of the grid frequency.

For example, a difference between a timing at which the power system operator sends the power command and a timing at which the input or output of the at least one distributed power energy resource changes after the predicted next power command is received may be less than a predetermined time.

This reduces time from when the command is sent by the power system operator to when the input or output of the distributed energy resource is changed, thereby improving the stability of the frequency of the power grid.

For example, the frequency control method may predict the next power command using the frequency measurement and a relationship between the frequency measurement and the power command which are in a memory.

This enables the system to predict the command more accurately.

For example, the frequency control method may predict the next power command using the frequency measurement, a past received power command, and a model indicating a relationship between the frequency measurement and the power command to be received.

This allows the prediction of the command to be more accurate.

For example, the model may be a regression model.

This allows the prediction of the command to be more accurate. In addition, the model is so simple and fast for computation.

For example, the frequency control method may include: controlling the input or output of the at least one distributed power energy resource using the power command to be received when the communication delay time is less than a predetermined value, and controlling the input or output of the at least one distributed power energy resource using the predicted next power command when the communication delay time is greater than the predetermined value.

Accordingly, it is determined whether or not a negative effect of the transmission delay is large, reducing the influence of a prediction error especially in a small communication delay. Therefore, the input or output of the distributed energy resources can follow the command sent by the power system operator more accurately.

For example, the frequency control method may include: calculating a prediction error; controlling the input or output of the at least one distributed power energy resource using the power command to be received when the prediction error is greater than a predetermined value; and controlling the input or output of the at least one distributed power energy resource using the predicted next power command when the prediction error is less than the predetermined value.

Accordingly, it is determined whether or not a negative effect of the transmission delay is large, reducing the influence of the prediction error especially in a large prediction error. Therefore, the input or output of the distributed energy resources can follow the command sent by the power system operator more accurately.

For example, the frequency control method may include: calculating a communication state; controlling the input or output of the at least one distributed power energy resource using the frequency measurement and the power command to be received when the communication state is normal; and controlling the input or output of the at least one distributed power energy resource using the frequency measurement when the communication state is abnormal or disconnected.

Accordingly, the previously-received power command for making the prediction is used, improving accuracy of the command prediction during the communication network being up. Accordingly, the prediction process can continue even when the network is down, by making the prediction based only on frequency measurements. In this method, predictions based only on frequency measurements is used, allowing the frequency regulation control to still continue even when problems occur in the network communication. In addition, the frequency regulation control is still accurate while the network communication is up.

For example, the frequency control method may be executed in the server by the server sending the power command to the local controller.

For example, the frequency control method may be executed in the local controller.

For example, a program is for use in a frequency control system including: a server that receives, from a power system operator, a power command for controlling a frequency of a power grid within a predetermined frequency; at least one distributed energy resource; and a local controller connected to the server through a communication network and to the at least one distributed energy resource. The program may cause the frequency control system to execute: receiving the power command from the power system operator; obtaining a frequency measurement of the power grid; predicting a next power command using the frequency measurement, before the next power command is received from the power system operator; and controlling an input or output of the at least one distributed power energy resource using the predicted next power command, before the next power command is received from the power system operator.

For example, a frequency control system includes: a server that receives, from a power system operator, a power command for controlling a frequency of a power grid within a predetermined frequency; at least one distributed energy resource; and a local controller connected to the server through a communication network and to the at least one distributed energy resource. The frequency control system may executes: receiving the power command from the power system operator; obtaining a frequency measurement of the power grid; predicting a next power command using the frequency measurement, before the next power command is received from the power system operator; and controlling an input or output of the at least one distributed power energy resource using the predicted next power command, before the next power command is received from the power system operator.

For example, a server is for use in a frequency control system including: the server that receives, from a power system operator, a power command for controlling a frequency of a power grid within a predetermined frequency; at least one distributed energy resource; and a local controller connected to the server through a communication network and to the at least one distributed energy resource. The server may include a controller that controls an input or output of the at least one distributed power energy resource. The controller may receive the power command from the power system operator; obtain a frequency measurement of the power grid; predict a next power command using the frequency measurement, before the next power command is received from the power system operator; and control the input or output of the at least one distributed power energy resource using the predicted next power command, before the next power command is received from the power system operator.

For example, a local controller is for use in a frequency control system including: a server that receives, from a power system operator, a power command for controlling a frequency of a power grid within a predetermined frequency; at least one distributed energy resource; and the local controller connected to the server through a communication network and to the at least one distributed energy resource. The local controller may include a controller that controls an input or output of the at least one distributed power energy resource. The controller may receive the power command from the power system operator; obtain a frequency measurement of the power grid; predict a next power command using the frequency measurement, before the next power command is received from the power system operator; and control the input or output of the at least one distributed power energy resource using the predicted next power command, before the next power command is received from the power system operator.

These general and specific aspects may be implemented using a system, an apparatus, a method, an integrated circuit, a computer program, or a non-transitory computer-readable recording medium such as a CD-ROM, or any combination of systems, apparatuses, methods, integrated circuits, computer programs, or computer-readable recording media.

Hereinafter, preferred embodiments of the present invention will be described with reference to the drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended claims and their equivalents. Therefore, among the structural elements in the following exemplary embodiments, structural elements not recited in any one of the independent claims are described as arbitrary structural elements.

(Embodiment 1)

FIG. 1 shows an overview of a system configuration according to an embodiment 1 of the present invention.

As shown in FIG. 1, a system according to the embodiment 1 of the present invention includes a power system operator 101, a central control system 102, a frequency sensor 103, a local control system 104, a grid-tie inverter 105, a controllable energy resource 106, and a power grid 107. The central control system 102 may have a frequency sensor 103. The system may have some local control systems 104. The power system operator 101 is connected to the central control system 102 with a single-purpose communication line through a communication medium which is typically a SCADA system.

The central control system 102 is connected to the local control system 104 through a communication medium. In the embodiment 1, the communication medium is a switched network between Ethernet (registered trademark) and wireless networks, and may be used for multiple purposes aside from sending control signals. This communication medium causes delay which occurs when the local control system 104 receives information transmitted by the central control system 102. The central control system 102 is connected to the frequency sensor 103 which provides frequency measurements through a communication interface. The frequency sensor 103 is a power meter, a power analyzer, or the like. Each of the central control system 102, the local control system 104, the grid-tie inverter 105 and the controllable energy resource 106 may include the frequency sensor 103.

The local control system 104 is connected to the grid-tie inverter 105, and can communicate with a controller of the grid-tie inverter 105.

The grid-tie inverter 105 is connected to the controllable energy resource 106 and to the power grid 107 through wires through which electric power is transmitted.

The controllable energy resource 106 may be an energy storage resource, load resource, or generation resource. In a case when the controllable energy resource 106 is the energy storage resource, the energy storage resource may be a storage battery or a plurality of storage batteries. A type of the storage battery may be a lithium-ion. The energy storage resource may also be pumped-hydro, compressed-air, flywheels, or capacitors. The controllable energy resource 106 may include the local control system 104 and the grid-tie inverter 105.

A normal operation of the overall system is described.

In the normal operation, the power system operator 101 sends commands to cause the controllable energy resource 106 to raise or lower its power output to the grid 107 or power input from the grid 107. The commands are sent at a fixed period. The central control system 102 receives the commands. The central control system 102 computes prediction of a next command by calculating the commands from the power system operator 101 and the frequency measurements from the frequency sensor 103. The central control system 102 sends the predicted command to the local control system 104 earlier than the command sent from the power system operator 101 is received at the local control system 104. In other words, the predicted command is sent early. This will be described in more detail later.

Upon receiving the predicted command, the local control system 104 transmits the received command to the grid-tie inverter 105. The grid-tie inverter 105 adjusts power of the controllable energy resource 106 in response to the command. Accordingly, the power is injected to or drawn from the power grid 107.

If the central control system 102 is connected to more than one local control systems 104, the central control system 102 calculates a prediction of the next command, and subsequently calculates distribution of the commands to each of the local control systems 104. The distribution of the predicted command allows the desired input or output of an aggregate system to be divided among the controllable energy resources 106, according to the controllable energy resources 106 information such as capacity, max charge/discharge rate, or state of charge.

Figure 2:
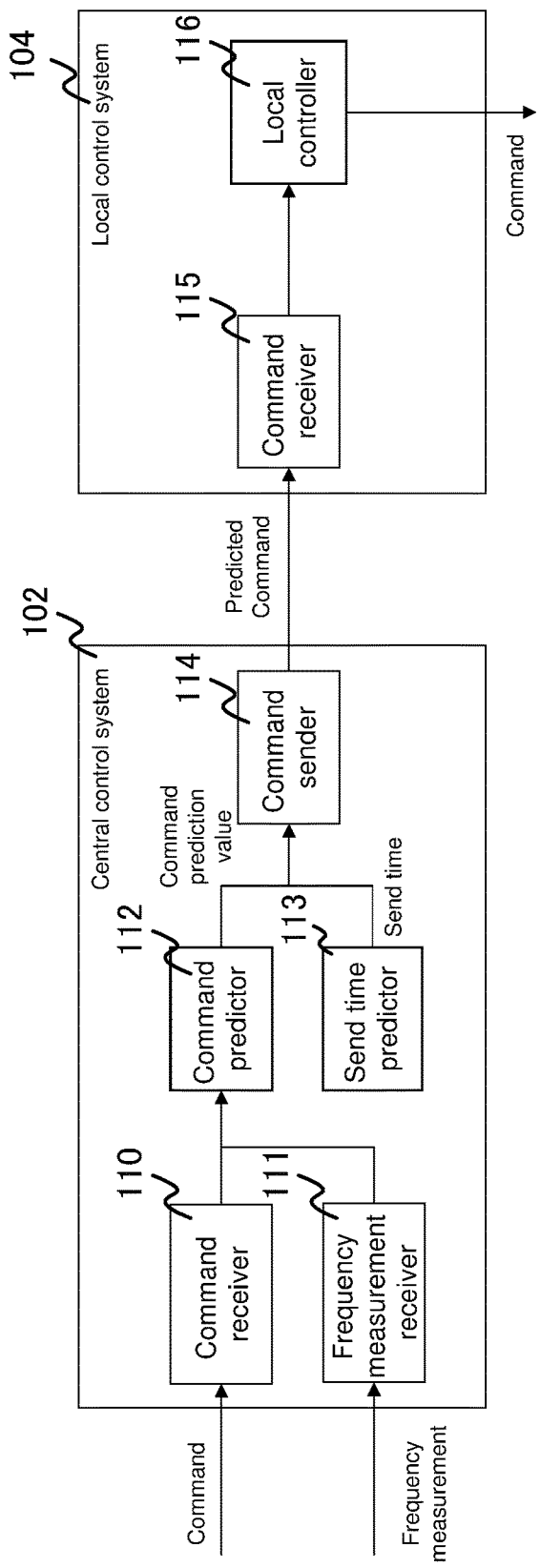
FIG. 2 is a diagram showing detailed configurations of a central control system and a local control system according to the embodiment 1 of the present invention.

FIG. 2 is a detailed diagram showing configurations of the central control system 102 and the local control system 104 which are described with reference to FIG. 1.

The central control system 102 includes a command receiver 110, a frequency measurement receiver 111, a command predictor 112, a send time predictor 113, and a command sender 114.

The command receiver 110 receives commands sent by the power system operator 101.

The frequency measurement receiver 111 receives frequency measurements from the frequency sensor 103.

The command predictor 112 calculates predictions of a command to be received next, using combination of frequency measurements and past received commands, or frequency measurements only.

The send time predictor 113 decides an optimal timing to send the predicted command. For example, the send time predictor 113 decides when an influence of the delay is minimized in transmission of the command over the communication medium to the local control system 104.

The command sender 114 sends the predicted command to the local control system 104 at the timing decided by the send time predictor 113.

The command receiver 110, the frequency measurement receiver 111, and the command sender 114 may be any combination of devices such as ethernet (registered trademark) network interface cards or modems.

The local control system 104 includes a command receiver 115 and a local controller 116. The command receiver 115 receives the commands sent from the central control system 102. The local controller 116 sends appropriate commands to the grid-tie inverter 105.

Figure 3:
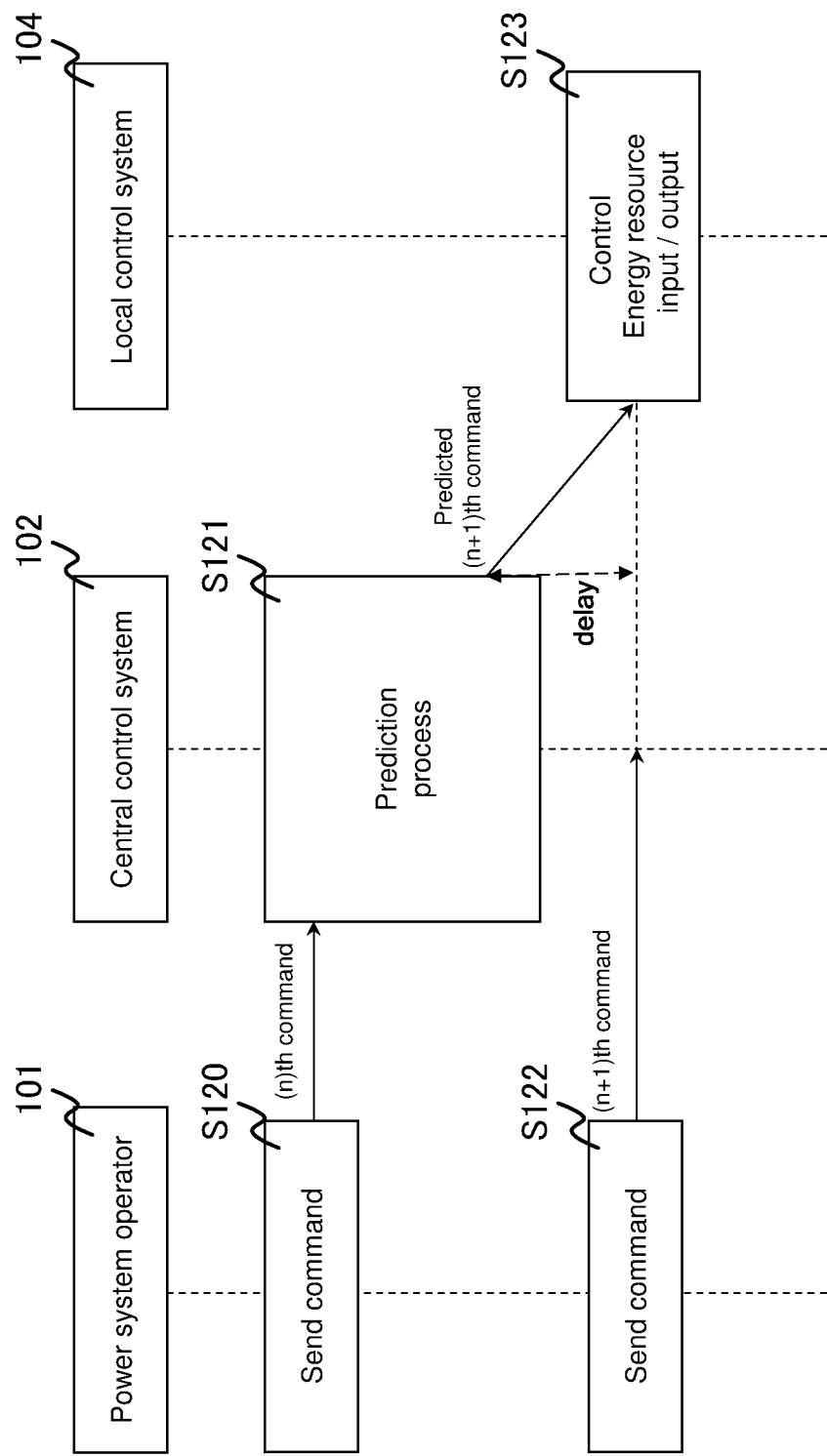
FIG. 3 is a sequence diagram of an overall system.

A sequence diagram of an overall system is shown in FIG. 3.

The sequence of a method is described as an interaction of three actors: the power system operator 101, the central control system 102, and the local control system 104.

The power system operator 101 periodically sends commands to the central control system 102 in a fixed period (S120, S122).

At the same time, the prediction process is executed in the command predictor 112. For example, when the command receiver 110 receives an nth command sent from the power system operator 101, the command predictor 112 calculates the prediction for an n+1th command that is expected to be received from the power system operator 101. This prediction of the n+1th command is sent out of the command sender 114 to the command receiver 115 earlier than the command receiver 115 receives the actual n+1th command, in consideration of the delay in transmission between the central control system 102 and the local control system 104 (S121). For example, a time error between the n+1th command received and the actual n+1th command is less than 0.1 msec. Typical delay times are in the range of 0.1 msec to 1s. The amount of the delay time varies depending on the number of networking hops, distance, and traffic of the network between the central control system 102 and the local control system 104.

The command receiver 115 receives the predicted n+1th command, and the local controller 116 controls an input or output of the controllable energy resource 106 (S123).

This reduces the influence of the communication delay, thereby enabling responses of the distributed energy resources to be matched more closely to the commands sent from the power system operator 101.

Figure 4:
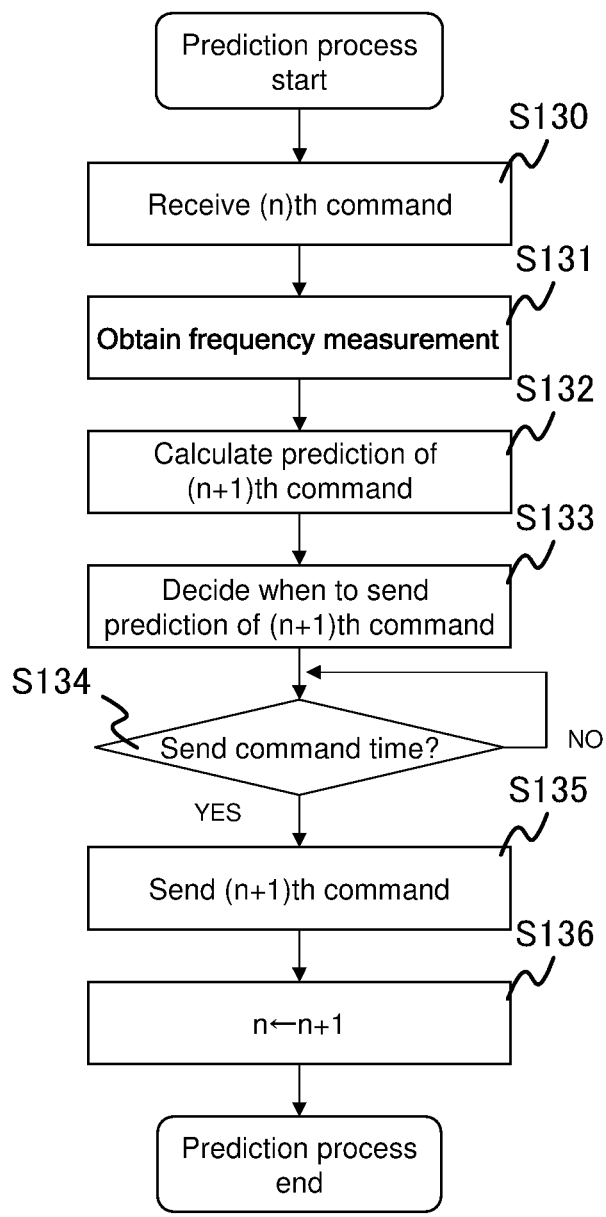
FIG. 4 is a flowchart for a procedure of a prediction process algorithm in the central control system.

A procedure of a prediction process algorithm executed in the central control system 102 will be described in detail with reference to a flowchart shown in FIG. 4.

First, the command receiver 110 receives an nth command (S130). After the nth command is received, the frequency measurement receiver 111 obtains a frequency measurement from a frequency measurement source as shown in FIG. 1 (S131). Then, using the received command and a frequency measurement, the command predictor 112 calculates a prediction of an n+1th command, i.e., the next command expected to be received (S132). The send time predictor 113 decides time instant at which the prediction of the n+1th command is sent to the local control system 104 (S133). This subprocess can proceed in parallel with the command prediction process. The command sender 114 waits by the time to send the predicted command (S134), and finally sends the predicted command to the local control system 104 (S135).

The entire process is repeated again to allow the n+1th command to be received, and to also allow an n+2th command to be predicted and sent (S136).

An algorithm for predicting the command (S132) and an algorithm for deciding when the predicted command is sent (S133) are described in further detail below.

The calculation of the predicted command is performed through a model. In a simple example, the prediction of the n+1th command is calculated as a linear combination of the received nth command ($C_n$, a measured frequency ($f_n$), and offset (d).

$$c_{n+1,predict} = ac_n + bf_n + d, \quad \text{[Expression 1]}$$

Here, a, b, and d are model parameters. It is necessary for the model parameters to be set before they are used for prediction. The parameters undergo a process of offline model fitting using collected past command data and past frequency measurements, and subsequently are initialized and set in a memory before the prediction process begins. The parameters are also updated via online periodically, by periodically re-fitting the model, or through an adaptive algorithm continuously.

For the fitting algorithm, a linear regression may be used.

It should be noted that the prediction of the n+1th command can be calculated without using the nth command (in other words, using the frequency measurements only). Alternatively, the prediction of the n+1th command can be calculated using the frequency measurement, received nth command, and one or more of past frequency measurements or past received commands. With this, improvement in the prediction accuracy is also expected. Several other variations of the prediction model include the following.

Using past frequency measurements and past commands, the prediction model is expressed as follows.

$$c_{n+1,predict} = a_0 c_n + a_1 c_{n-1} + \ldots + a_N c_{n-N} + b_0 f_n + b_1 f_{n-1} + \ldots + b_M f_{n-M} + e \quad \text{[Expression 2]}$$

Figure 5A:
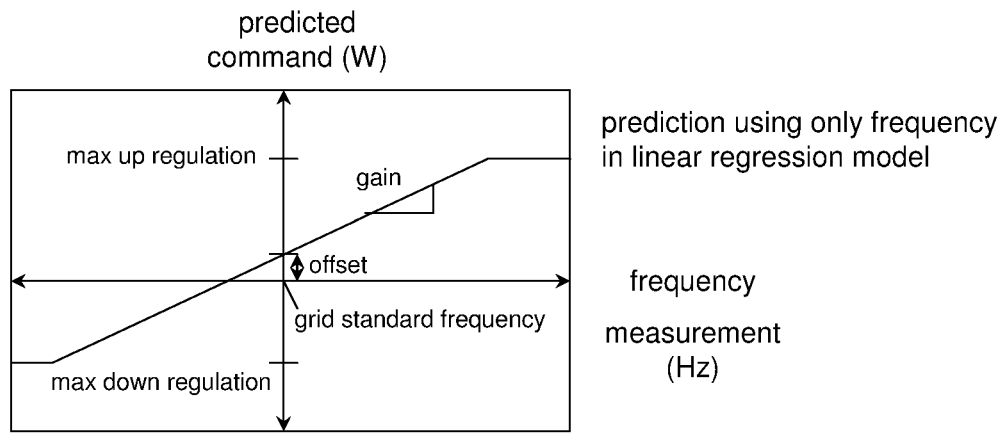
FIG. 5A is a diagram showing an example of a model used for predicting a command using frequency measurements.
Figure 5B:
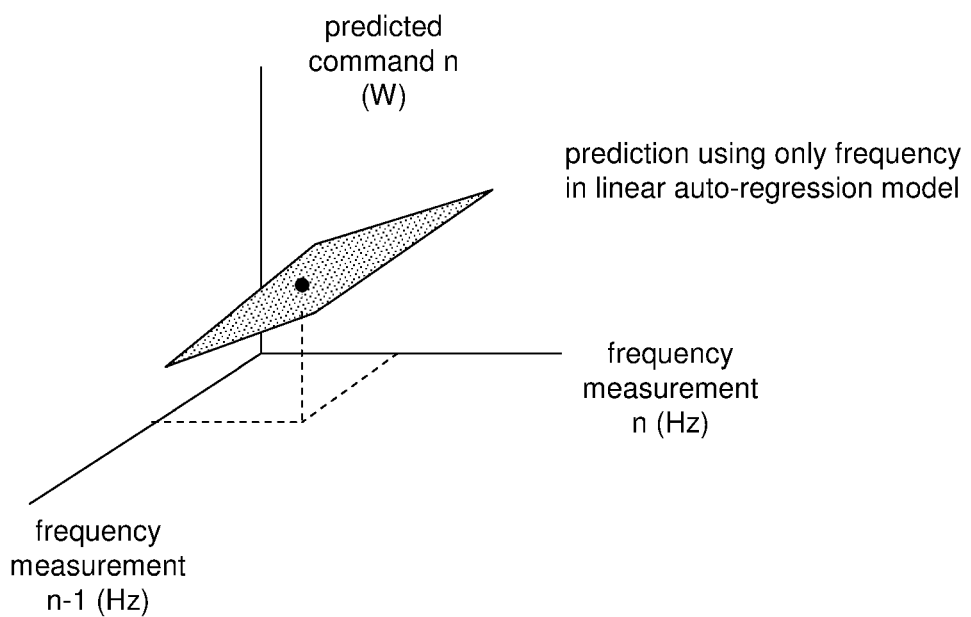
FIG. 5B is a diagram showing an example of a model used for predicting a command using frequency measurements.

Using frequency measurements only, the prediction model is expressed as follows (this model is shown in FIGS. 5A and 5B).

$$c_{n+1,predict} = bf_n + d \quad \text{[Expression 3]}$$

Using a filter of past frequency measurements, the prediction model is expressed as follows:

$$c_{n+1,predict} = a_0 c_{n,predict} + a_1 c_{n-1,predict} + \ldots + a_N c_{n-N,predict} + b_0 f_n + b_1 f_{n-1} + \ldots + b_M f_{n-M} \quad \text{[Expression 4]}$$

Using a filter of past frequency measurements and past commands, the prediction model is expressed as follows:

$$c_{n+1,predict} = a_0 c_{n,predict} + a_1 c_{n-1,predict} + \ldots + a_N c_{n-N,predict} + d_0 c_n + d_1 c_{n-1} + \ldots + d_N c_{n-N} + b_0 f_n + b_1 f_{n-1} + \ldots + b_M f_{n-M} \quad \text{[Expression 5]}$$

It should be noted that values of parameters a, b, d, e, and so on after fitting are not necessarily the same among the models above.

An algorithm for deciding when the command is sent is described below.

First, an amount of delay in transmitting a command from the central control system 102 to the local control system 104 is estimated. For example, the delay is estimated by sending a ping, waiting until a reply to the ping is received, measuring time difference between the sending of the ping and the receiving of the reply, and dividing the measured time difference by two. An alternative way is to synchronize clocks of the central control system 102 and the local control system 104, and to include a time-stamp in a command when the command is sent to the local control system 104. The local control system 104 then compares the time-stamp in the command packet with a time point at which the local control system 104 has received the packet, so as to compute the delay as the difference. The delay information needs to be communicated back to the central control system 102.

When the delay is estimated, the send time predictor 113 decides the time instant to send the predicted command by the following equation.

Time at which the n+1th predicted command is sent=Time at which the nth command is received+a time period necessary for the power system operator to send commands–the estimated delay between the central control system 102 and the local control system 104.

Finally, an effect of the present invention will be described with reference to FIG. 6.

FIG. 6 shows an influence of the communication delay on the command signal, an example of the timing to send the predicted command, and an effect of sending the predicted command at the predetermined timing.

The first plot (a) is an example of a command sent from the power system operator 101. The graph plots the desired power input in or output from a resource relative to time. The command itself is sent periodically. Assuming that the transmission delay between the power system operator 101 and the central control system 102 is very small, a waveform of the desired input power or output power received at the central control system 102 is almost the same as that shown in the first plot (a).

The second plot (b) shows a waveform of commands when they are received. The commands are sent from the central control system 102 and are delayed due to the transmission delay in a communication medium. A horizontal arrow represents the delay time. If the local control system 104 follows this command signal, changes in the input power or output power, which occur in the local control system 104, are late from a point of view of the command signal sent by the power system operator 101.

Instead of simply sending the command received from the power system operator 101 to the local control system 104, the central control system 102 makes a prediction of a command signal to be received, and sends the predicted command signal earlier, in the embodiment 1 of the present invention.

The third plot (c) and the fourth plot (d) show waveforms of the predicted command signal that is the actual command signal temporally shifted from the predicted command signal by the amount of time equal to the estimated transmission delay. The predicted command is sent, and then arrives at the local control system 104 as if the central control system 102 has sent the actually received signal through a communication medium with less delay.

Comparing the signal in the first plot (a) with the signal in the fourth plot (d), they are not temporally shifted earlier or later relative to each other.

In summary, the effect of the embodiment 1 of the present invention is that the response of the distributed energy resources can be matched more closely to the command sent from the power system operator 101, by reducing the influence of the communication delay.

As a result, the power system operator 101 can control the controllable energy resource 106 as intended.

(Embodiment 2)

Figure 7:
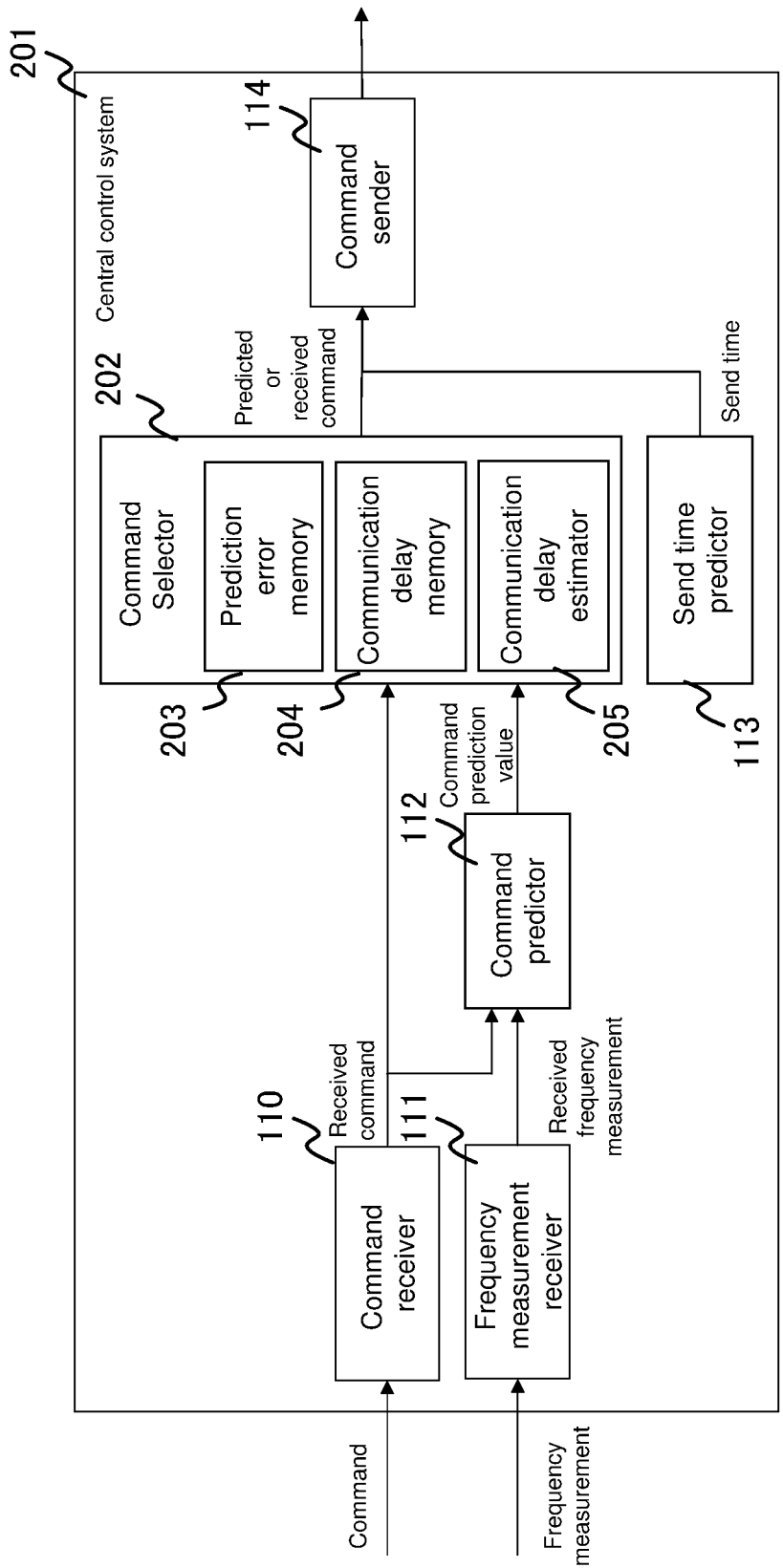
FIG. 7 is a diagram showing detailed configurations of a central control system and a local control system according to an embodiment 2 of the present invention.

An embodiment 2 of the present invention will be described below, with reference to FIGS. 7 and 8.

The embodiment 2 is similar to the embodiment 1, except that the embodiment 2 includes a command selector 202 having a function of deciding which one of predicted commands or actually received commands are sent. The command selector 202 sends the predicted command before the command from the power system operator 101 is received, waits until the command from the power system operator 101 is received, and then sends the received command.

The overall configuration of a system is the same as that of the embodiment 1, which is shown in FIG. 1. The local control system 104 is also the same as that of the embodiment 1, which is shown in FIG. 2. A detailed configuration of a central control system is shown in FIG. 7. A central control system 201 has the same parts as those in the embodiment 1, and thus such parts are not described here.

The central control system 201 includes the command selector 202, which is a unique part of the embodiment 2 of the present invention. The command selector 202 includes a prediction error memory 203, a communication delay memory 204, and a communication delay estimator 205. The command sender 114 sends a received or predicted command, which is selected by the command selector 202.

The prediction error memory 203 stores past records of prediction errors.

The communication delay memory 204 stores past transmission delay.

The communication delay estimator 205 estimates present transmission delay, which is a similar function as that of the aforementioned send time predictor 113.

The command selector 202 decides whether (i) sending the predicted command before the command is received, or (ii) waiting until the command is received by the central control controller and then sending the received command.

When the transmission delay is large, it may be optimal to send the prediction of a command early. However, when the transmission delay is small, it may not be necessary to send the prediction of the command early.

On the other hand, when the error in a prediction of the next command is large, it may be better to wait until the command is received and then send the received command. When the prediction error is small, it may be better to send the predicted command.

The command selector 202 estimates prediction errors using the prediction error memory 203 and estimates transmission delay using the communication delay memory 204 and the communication delay estimator 205. The command selector 202 decides a command to be sent based on the estimated prediction error and the estimated transmission delay (a method for deciding the command to be sent is described in more detail later).

Figure 8:
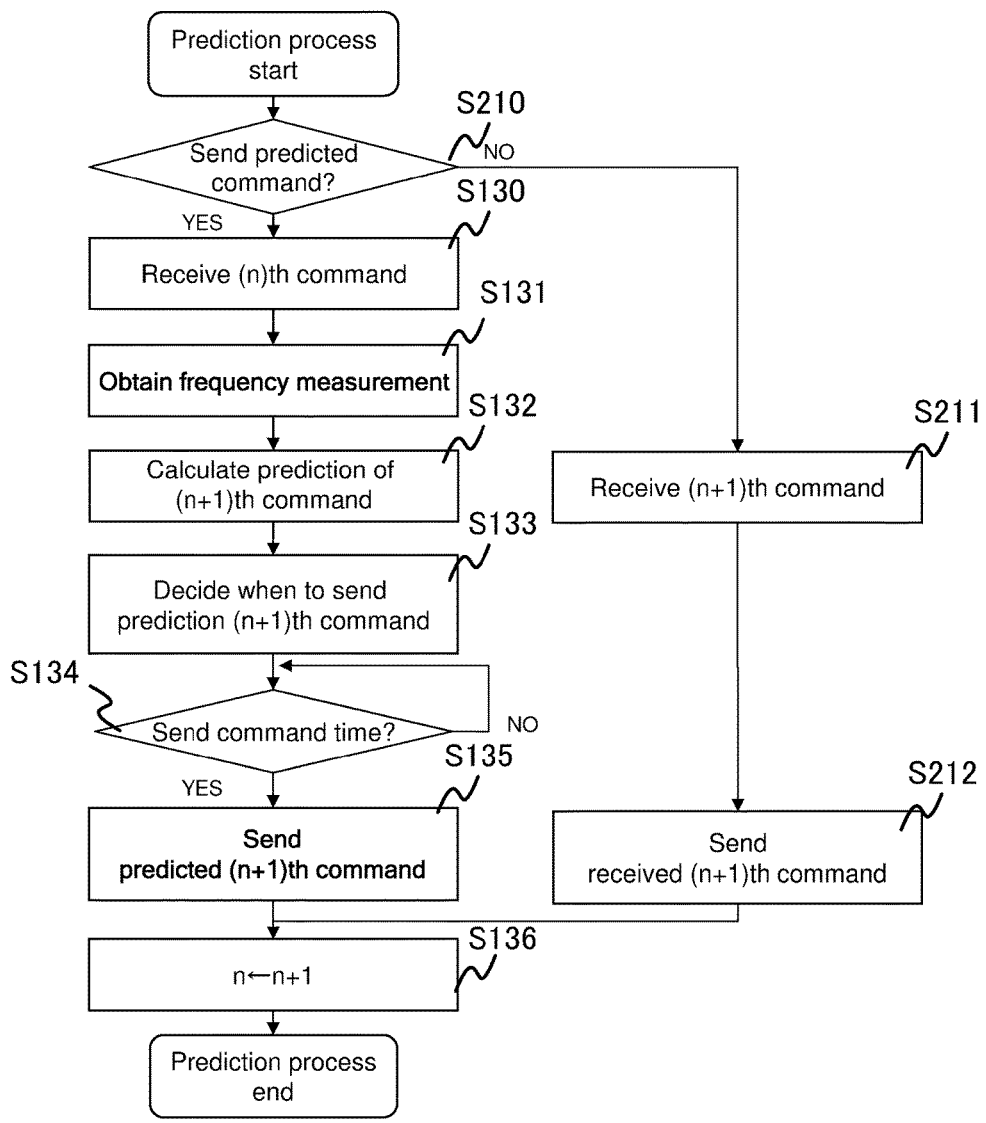
FIG. 8 is a flowchart for a procedure of a prediction process algorithm in the central control system according to the embodiment 2.

FIG. 8 is a flowchart of an algorithm of the central control system 201.

When a process starts, the command selector 202 first decides whether or not to send the predicted command (S210). If the command selector 202 decides to send the predicted command (Yes at S210), the remainder of the flowchart is the same as those in the embodiment 1 (shown in FIG. 4). On the other hand, if the system decides not to send the predicted command (No at S210), the command selector 202 waits until the command receiver 110 receives an n+1th command (S211), and then the command sender 114 sends the received n+1th command to the local control system 104 immediately after the command receiver 110 receives the n+1th command (S212).

A method for deciding whether or not to send the predicted command is described below.

The command selector 202 decides which one of the predicted command and the received command should be sent for excellent overall system performance.

As an example of a criteria for the above, the command selector 202 selects whether or not to send the predicted command based on a threshold. For example, if the prediction error of the previous nth command is larger than a threshold value, the command selector 202 selects to send the received n+1th command instead of sending the predicted n+1th command. Alternatively, if the transmission delay of the previous command is larger than the threshold value, the command selector 202 selects to send the predicted n+1th command early instead of waiting to receive the n+1th command.

As another example of such criteria, the command selector 202 selects whether or not to send the predicted command or the received command based on which one of them contributes to the regulation service greater. In some regions, contribution to the regulation service depends on performance including several aspects such as command following accuracy.

Service providers may be penalized for inaccurate or delayed responses. In these regions, based on a calculation method for an incentive applicable to the predetermined region, the command selector 202 can calculate the incentive to be hypothetically received in the case when a predicted response is sent with an estimated prediction error, and when the received command is sent with delay.

In summary, according to the embodiment 2 of the present invention, the local control system 104 can advantageously receive the predicted command or the actual command depending on the situation.

As a result, the power system operator 101 may control the controllable energy resource 106 as intended better.

(Embodiment 3)

Figure 9:
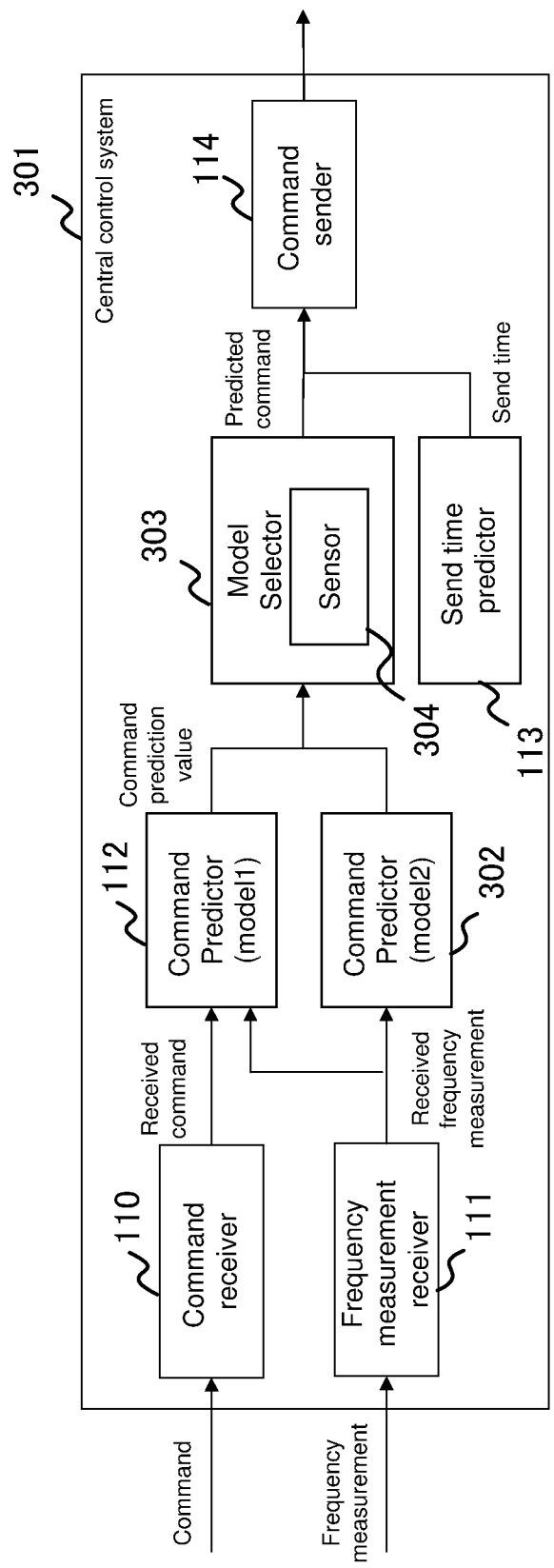
FIG. 9 is a diagram showing detailed configurations of a central control system and a local control system according to an embodiment 3 of the present invention.

An embodiment 3 of the present invention will be described below, with reference to FIGS. 9 and 10.

The embodiment 3 is similar to the embodiment 1, except that the embodiment 3 includes two command predictors based on models different from each other, and a model selector 303. A detailed configuration of a central control system is shown in FIG. 9. A central control system 301 has the same parts as those in the embodiment 1, and thus they are not described here.

The command predictor (model 1) 112 makes command predictions based both on received commands and received frequency measurements (prediction 1). On the other hand, a command predictor 302 (model 2) makes command predictions based only on the received frequency measurements (prediction 2). The model 1 and model 2 may be the same as the models described in the embodiment 1.

The model selector 303 selects which one of the command predictions (prediction 1 or prediction 2) is sent to the local control system 104 through the command sender 114. The model selector 303 includes a sensor 304. For example, the sensor 304 may be a method of sensing the condition of a communication network between the power system operator 101 and the central control system 301. If a state of the communication network is normal, the model selector 303 selects to use the prediction 1. If the communication with the power system operator 101 is abnormal or the connection is down, the command predictor 112 cannot receive commands from the power system operator 101 and cannot make the prediction 1, and therefore the model selector 303 selects to use the prediction 2.

Figure 10:
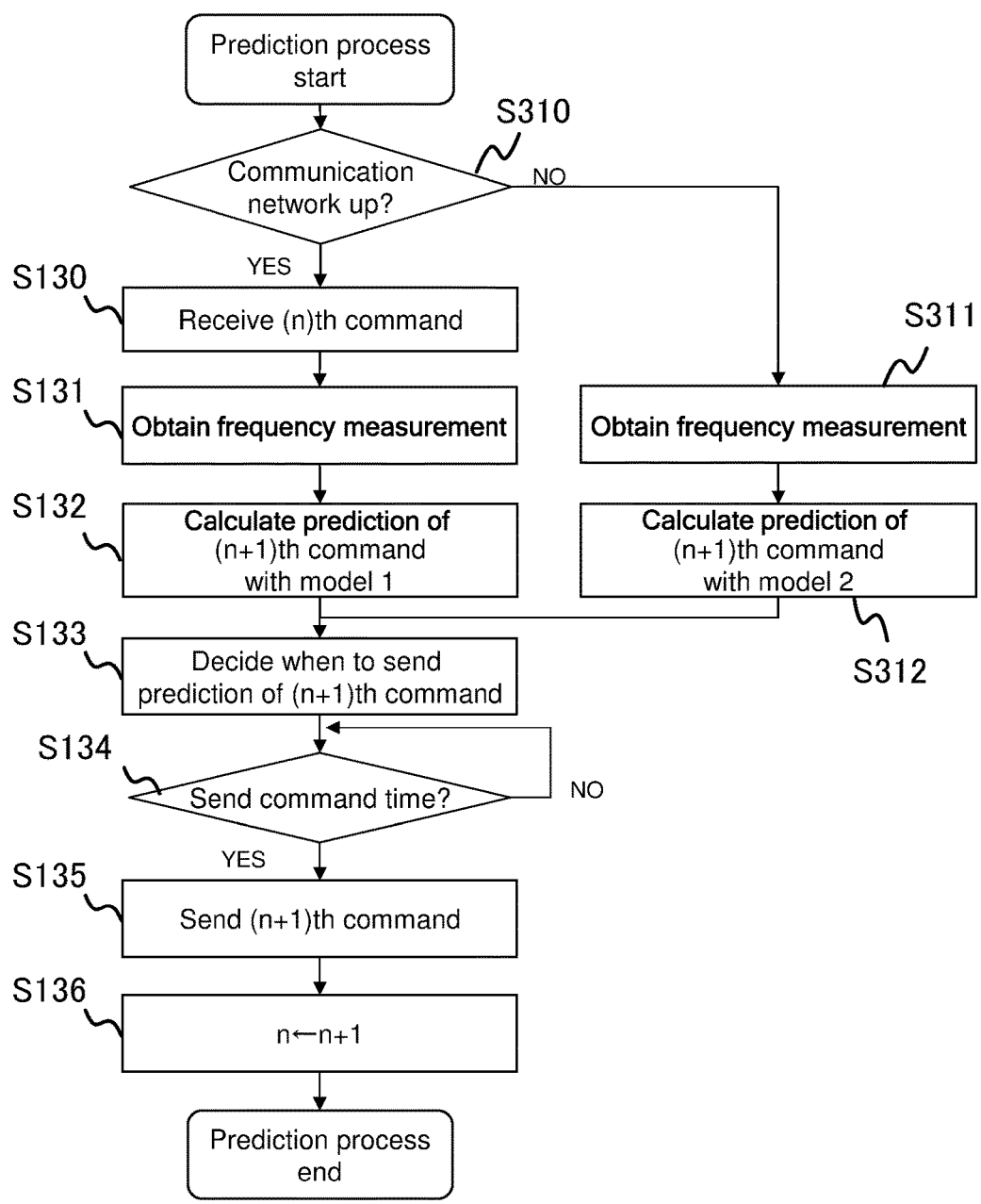
FIG. 10 is a flowchart for a procedure of a prediction process algorithm in the central control system according to the embodiment 3.

FIG. 10 shows a flowchart of a prediction process in detail. When the prediction process starts, in the method, it is first decided whether communication network is up (S310). This is implemented by the sensor 304 shown in FIG. 9 through methods. For example, the communication network may be a TCP/IP network, and the sensor 304 may be a program used to judge a connection state based on how long ago the last received TCP acknowledge packet was.

If the model selector 303 decides that the network is down (No in S310), the command predictor 302 obtains the frequency measurement (S311), and calculates the prediction of an n+1th command with the model 2 (S312). If the model selector 303 decides that the network is up (Yes in S310), the command predictor 112 waits to receive an nth command (S130), obtains a frequency measurement (S131), and calculates the prediction of the n+1th command with the model 1 (S132). The remainder of the flowchart is the same as those in the embodiment 1 (shown in FIG. 4).

The model 1 has an advantage that its predictions are often more accurate, whereas the model 2 has an advantage that it can makes predictions without need for receiving the commands. This means that predictions can be made with the model 2 even when the communication network state is abnormal. Therefore, both the model 1 and the model 2, and a selector are advantageously used for implementing the method, thereby selecting the prediction 1 or the prediction 2 depending on the conditions of the communication network.

(Option 1)

Option 1 may be used together with any of the embodiments of the present invention. In the option 1, the method described in any of the embodiments is implemented on local control systems 402 of distributed energy resources, instead of on a central control system 401.

Figure 11:
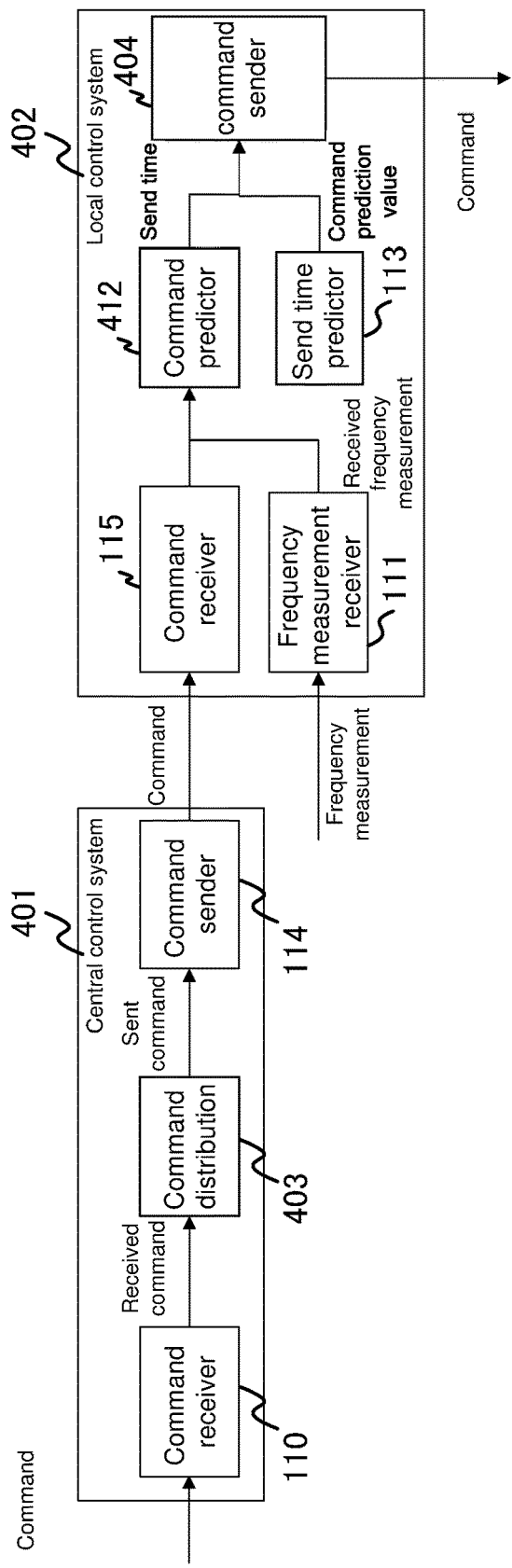
FIG. 11 is a diagram showing detailed configurations of a central control system and a local control system according to the embodiment 1, option 1, of the present invention.

The overview of a system configuration according to the option 1 is shown in FIG. 11. This option of the embodiment 1 is the same as the embodiment 1 shown in FIG. 2, except that a prediction algorithm is used on the local control system 402 instead of the central control system 401.

The central control system 401 includes a command distribution 403. If there are more than one local control system 402, the command distribution 403 distributes received commands to the local control systems 402.

The local control system 402 includes the command receiver 115, the frequency measurement receiver 111, a command predictor 412, a command sender 404, and the send time predictor 113. The command receiver 115 and the frequency measurement receiver 111 are both connected to the command predictor 412, and the command sender 404 is connected to the command predictor 412 and the send time predictor 113. The local control system 402 has a configuration partially identical to that in the embodiment 1.

The command predictor 412 makes predictions of a command to be received next from the central control system 401. The command sender 404 sends the predicted commands to controllers of distributed energy resources. The predicted command is sent at an earlier time than the command is received by the central control system 401.

More precisely, the time at which the command is sent is decided by the send time predictor 113.

The controller of the distributed energy resource mentioned above may be a microcontroller that implements a method of controlling the power input or output of the grid-tie inverter 105 that connects the controllable energy resource 106 to the power grid 107. The controller of the distributed energy resource and the local control system 402, where the method of the present invention is implemented, may be on the same circuit board or different boards physically close to each other, and may be connected through serial or parallel end-to-end connections or buses. Such connection has low latency.

The effect of the option 1 is the same as those in any of the above embodiments: the influence of the communication delay is decreased. There is an additional advantage of the option 1: the prediction process is implemented on the local control system 402 side instead of the central control system 401 side, thereby reducing the time difference between the sampling of the frequency measurement and the arrival of the sent predicted command at the energy resource. This is because that the delay does not incur in transmitting the predicted command through the communication network.

The advantage of having less delay between the sampling of the frequency measurement and control action by the energy resource controller is that the system can respond faster to changes in the frequency. This makes the system more effective at controlling grid frequency fluctuations.

Figure 12:
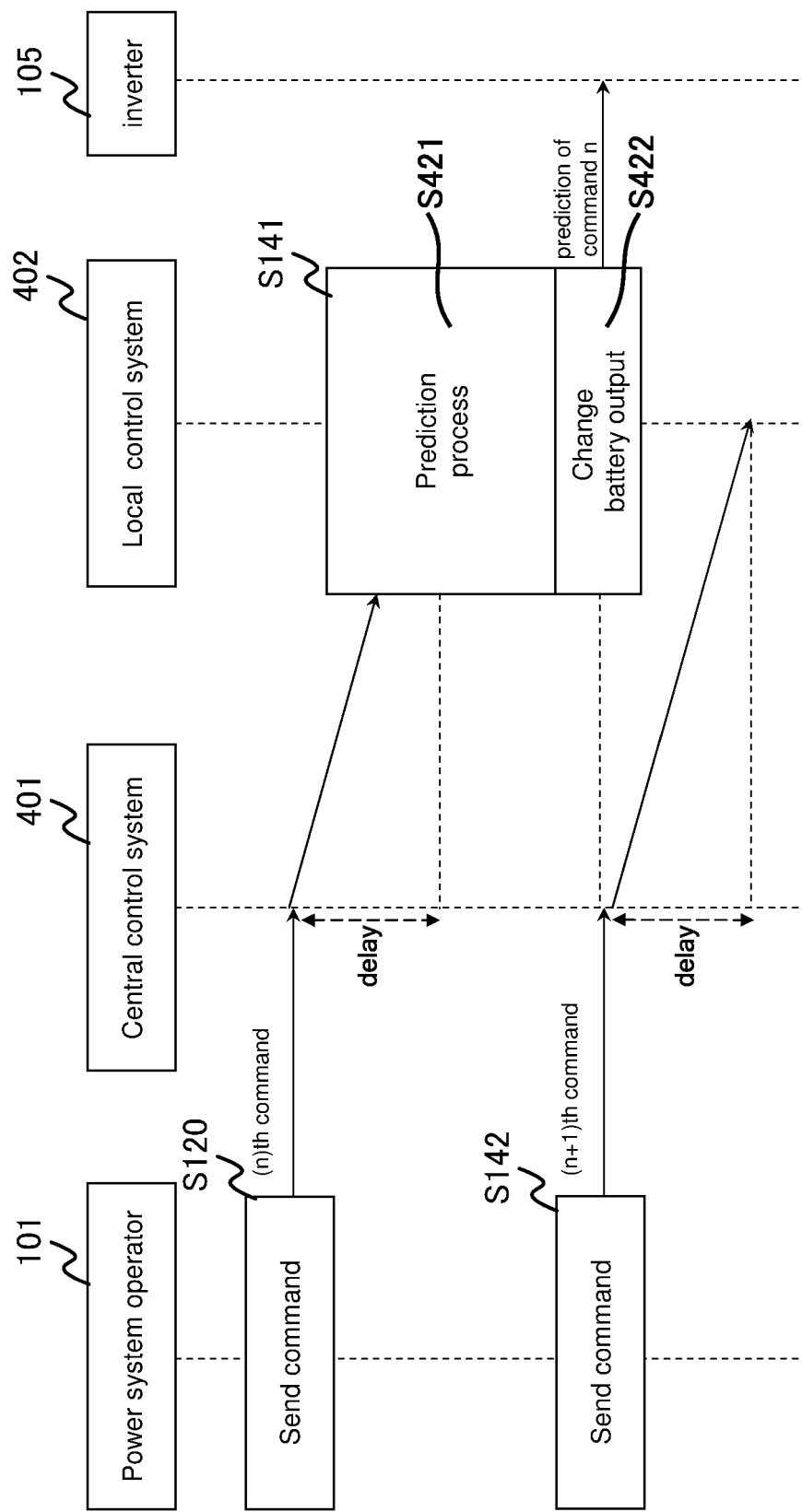
FIG. 12 is a sequence diagram according to the embodiment 1, the option 1 of the present invention.

The detailed sequence of the method according to the option 1 is shown in FIG. 12.

The power system operator 101 sends commands at a fixed period of time (S120). The central control system 401 sends the commands to the local control system 402 as soon as the central control system 401 receives the commands. The time at which the commands arrive at the local control system 402 is delayed due to transmission delay in a communication medium between the central control system 401 and the local control system 402.

The prediction process is running on the local control system 402. For example, if the prediction process according to the embodiment 1 (shown in FIG. 4) is used, the prediction process running on the local control system 402 could be the same as those described in the embodiment 1 (S421). After the prediction, the local control system 402 waits by the time decided to send the predicted command, and then sends the predicted command to the grid-tie inverter 105 (S422). As shown in the sequence of FIG. 12, the prediction of a command n+1 is sent to the grid-tie inverter 105 earlier than the n+1th command is received by the central control system 401. The timing of sending the prediction of the command n+1 is decided so that the prediction arrives at the grid-tie inverter 105 at the same time as the command n+1 is received by the grid-tie inverter 105 in the case when no delay incurs in the communication between the central control system 401 and local control system 402.

This option 1 can be incorporated in the embodiment 1, the embodiment 2, and the embodiment 3.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the system, and the like according to each of the embodiments is a program described below Specifically, the program causes a computer to execute a frequency control method for use in a frequency control system including: a server that receives, from a power system operator, a power command for controlling a frequency of a power grid within a predetermined frequency; at least one distributed energy resource; and a local controller connected to the server through a communication network and to the at least one distributed energy resource. The frequency control method includes: receiving the power command from the power system operator; obtaining a frequency measurement of the power grid; predicting a next power command using the frequency measurement, before the next power command is received from the power system operator; and controlling an input or output of the at least one distributed power energy resource using the predicted next power command, before the next power command is received from the power system operator.

Each of the components may be a circuit. These circuits, as a whole, may form a single circuit, or may independently be a single circuit. Each of the circuits may be a general circuit or a dedicated circuit.

Although frequency control methods according to one or more embodiments are described in accordance with the embodiments, the present invention is not limited to the embodiments. Forms obtained by various modifications to the exemplary embodiments that can be conceived by a person of skill in the art as well as forms realized by combining structural components in different exemplary embodiments, which are within the scope of the essence of the present disclosure may be included in one or more aspects.

For example, processes performed by a specified processing unit may be performed by another processing unit. In addition, the order of a plurality of processes may be changed, and a plurality of processes may be performed in parallel.

INDUSTRIAL APPLICABILITY

The present invention is useful for frequency control in a power system.

[Reference Signs List]

101: Power system operator
102, 201, 301, 401: Central control system
103: Frequency sensor
104, 402: Local control system
105: Grid-tie inverter (Inverter)
106: Controllable energy resource
107: Electricity grid
110, 115: Command receiver
111: Frequency measurement receiver
112, 302, 412: Command predictor
113: Send time predictor
114, 404: Command sender
116: Local controller
202: Command selector
203: Prediction error memory
204: Communication delay memory
205: Communication delay estimator
303: Model selector
304: Sensor
403: Command distribution

The invention claimed is:

1. A frequency control method for use in a frequency control system including:
   a server that receives, from a power system operator, a power command for controlling a power grid to operate within a predetermined frequency;
   at least one distributed energy resource; and
   a local controller connected to the server through a communication network and to the at least one distributed energy resource,
   the frequency control method comprising:
   receiving, at a first time point and by the server, a first power command from the power system operator;
   obtaining, by the server and from a frequency sensor, a measurement of an operating frequency of the power grid after the first time point and before a second time point;
   calculating, by the server, a frequency based power command using the measurement of the operating frequency, the frequency based power command being calculated before a second power command is received at the second time point from the power system operator;
   calculating, by the server, communication delay time in the communication network;
   transmitting, by the server to the local controller, the second power command when the communication delay time is less than a predetermined value, and transmitting, by the server to the local controller, the frequency based power command when the communication delay time is greater than the predetermined value; and
   controlling, by the local controller, an input or output of the at least one distributed power energy resource using the second power command or the frequency based power command,
   wherein the first time point is earlier than the second time point.

2. The frequency control method according to claim 1, wherein a difference between the first time point at which the power system operator sends the first power command and a time point at which the input or output of the at least one distributed power energy resource changes after the frequency based power command is received is less than a predetermined time.

3. The frequency control method according to claim 1, wherein the calculating the frequency based power command includes:
   calculating the frequency based power command using the measurement of the operating frequency, and a relationship between the measurement of the operating frequency and the first power command stored in a memory of the server.

4. The frequency control method according to claim 1, wherein the calculating the frequency based power command includes:
   calculating the frequency based power command using the measurement of the operating frequency, a past power command received before the first time point, and a model indicating a relationship between the measurement of the operating frequency and the second power command to be received.

5. The frequency control method according to claim 4, wherein the model is a regression model.

6. The frequency control method according to claim 1, further comprising:
   calculating, by the server, an error value of the frequency based power command with respect to the second power command;
   controlling, by the local controller, the input or output of the at least one distributed power energy resource using the second power command which is to be received and is different from the frequency based power command when the calculated error is greater than a predetermined value; and
   controlling, by the local controller, the input or output of the at least one distributed power energy resource using the frequency based power command when the calculated error is less than the predetermined value.

7. The frequency control method according to claim 1, further comprising:
   calculating, by the server, a communication state of the communication network; and
   controlling, by the local controller, the input or output of the at least one distributed power energy resource using the frequency measurement when the communication state is abnormal or disconnected.

8. The frequency control method according to claim 1, wherein in the calculating of the frequency based power command, the server calculates the frequency based power command using a linear combination of the measurement of the operating frequency, a value of the first power command, and a predetermined offset value.

9. A non-transitory computer-readable medium having a program recorded thereon, the program for use in a frequency control system, the frequency control system including a server that receives, from a power system operator, a power command for controlling a power grid to operate within a predetermined frequency; at least one distributed energy resource; and a local controller connected to the server through a communication network and to the at least one distributed energy resource,
   wherein the program causes the frequency control system to execute:
   receiving, at a first time point and by the server, a first power command from the power system operator;
   obtaining, by the server and from a frequency sensor, a measurement of an operating frequency of the power grid after the first time point and before a second time point;
   calculating, by the server, a frequency based power command using the measurement of the operating frequency, the frequency based power command being calculated before a second power command is received at the second time point from the power system operator;
   calculating, by the server, communication delay time in the communication network;
   transmitting, by the server to the local controller, the second power command when the communication delay time is less than a predetermined value, and transmitting, by the server to the local controller, the frequency based power command when the communication delay time is greater than the predetermined value; and
   controlling, by the local controller, an input or output of the at least one distributed power energy resource using the second power command or the frequency based power command,
   wherein the first time point is earlier than the second time point.

10. A frequency control system comprising:
 a server that receives, from a power system operator, a power command for controlling a power grid to operate within a predetermined frequency, the server including a processor;
 at least one distributed energy resource; and
 a local controller connected to the server through a communication network and to the at least one distributed energy resource,
 wherein the server:
 receives, at a first time point, the power command from the power system operator;
 obtains, from a frequency sensor, a measurement of an operating frequency of the power grid after the first time point and before a second time point;
 calculates, a frequency based power command using the measurement of the operating frequency, the frequency based power command being calculated before a second power command is received at the second time point from the power system operator;
 calculates communication delay time in the communication network; and
 transmits, to the local controller, the second power command when the communication delay time is less than a predetermined value, and transmits, to the local controller, the frequency based power command when the communication delay time is greater than the predetermined value,
 wherein the local controller:
 controls an input or output of the at least one distributed power energy resource using the second power command or the frequency based power command, and
 wherein the first time point is earlier than the second time point.

11. A server for use in a frequency control system including:
 the server that receives, from a power system operator, a power command for controlling a power grid to operate within a predetermined frequency;
 at least one distributed energy resource; and
 a local controller connected to the server through a communication network and to the at least one distributed energy resource,
 wherein the server comprising a processor that:
 controls an input or output of the at least one distributed power energy resource,
 receives, at a first time point, a first power command from the power system operator;
 obtains, from a frequency sensor, a measurement of an operating frequency of the power grid after the first time point and before a second time point;
 calculates a frequency based power command using the measurement of the operating frequency, the frequency based power command being calculated before a second power command is received at the second time point from the power system operator;
 calculates communication delay time in the communication network; and
 controls, via the communication network, the input or output of the at least one distributed power energy resource using the second power command when the communication delay time is less than a predetermined value, and controls, via the communication network, the input or output of the at least one distributed power energy resource using the frequency based power command when the communication delay time is greater than the predetermined value,
 wherein the first time point is earlier than the second time point.

12. A local controller for use in a frequency control system including:
 a server that receives, from a power system operator, a power command for controlling a power grid to operate within a predetermined frequency;
 at least one distributed energy resource; and
 the local controller connected to the server through a communication network and to the at least one distributed energy resource,
 wherein the local controller comprising a processor that:
 controls an input or output of the at least one distributed power energy resource,
 receives, at a first time, a first power command from the power system operator;
 obtains, from a frequency sensor, a measurement of an operating frequency of the power grid after the first time point and before a second time point;
 calculates a frequency based power command using the measurement of the operating frequency, the frequency based power command being calculated before a second power command is received at the second time point from the power system operator; and
 controls the input or output of the at least one distributed power energy resource using the second power command when communication delay time is less than a predetermined value, and controls the input or output of the at least one distributed power energy resource using the frequency based power command when the communication delay time is greater than the predetermined value,
 wherein the first time point is earlier than the second time point.

* * * * *